Dec. 18, 1962   G. H. SMITH ETAL   3,068,696
WATER METER REGISTER CASINGS
Filed May 7, 1956   3 Sheets-Sheet 1
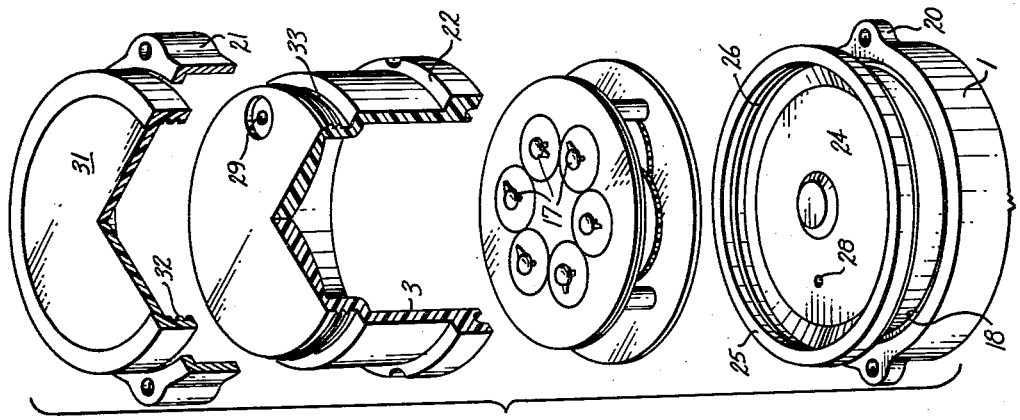
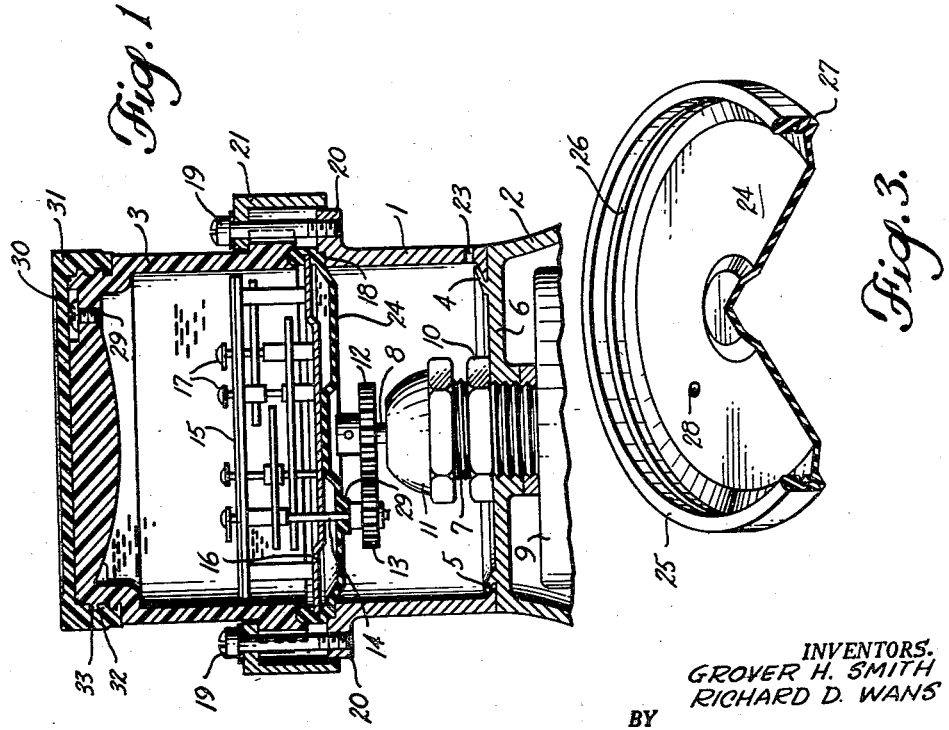
INVENTORS.
GROVER H. SMITH
RICHARD D. WANS
BY
ATTORNEYS Dec. 18, 1962  G. H. SMITH ETAL  3,068,696
WATER METER REGISTER CASINGS
Filed May 7, 1956  3 Sheets-Sheet 2

INVENTORS.
GROVER H. SMITH
RICHARD D. WANS
BY
Reynolds, Beach & Christensen
ATTORNEYS

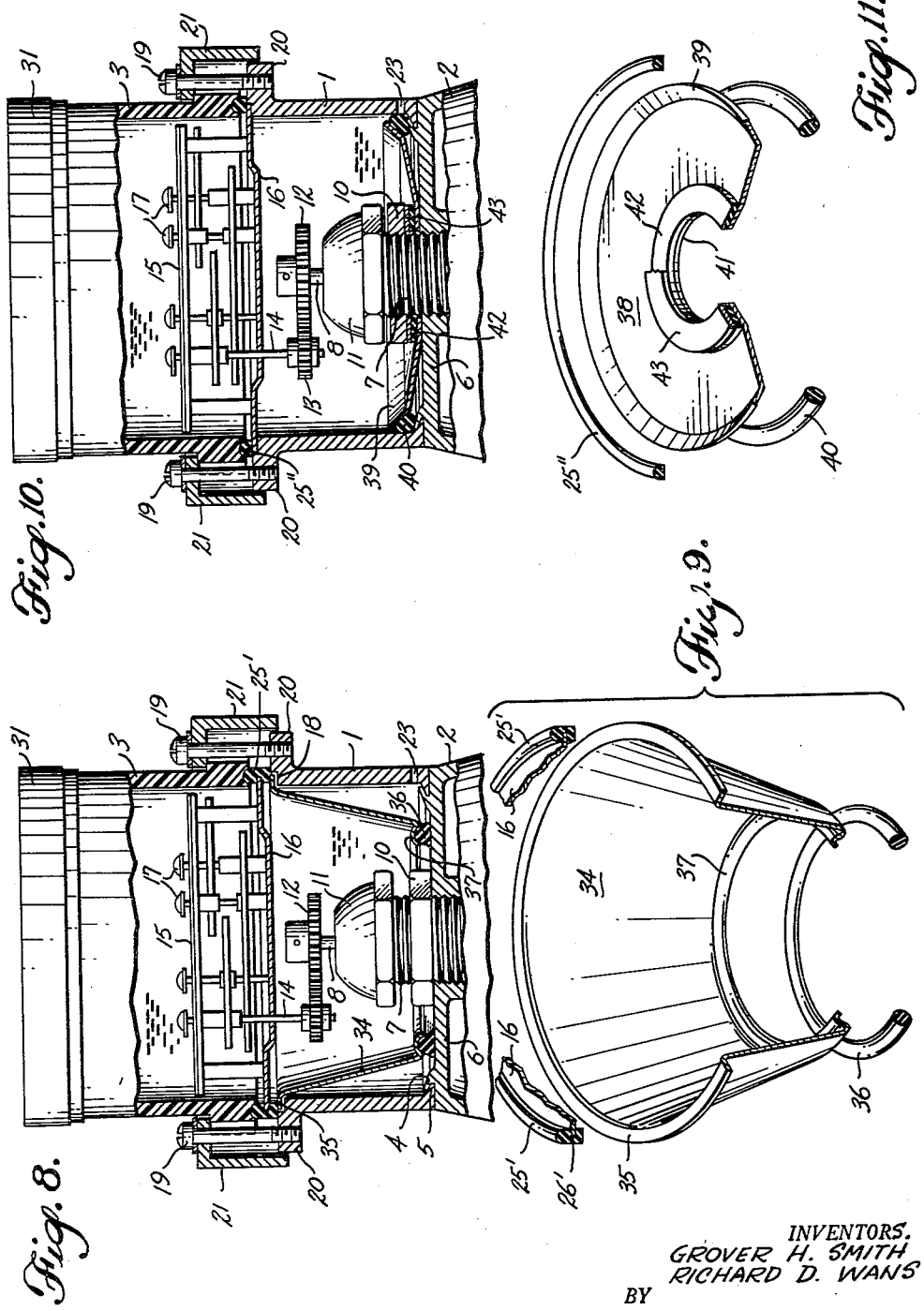

United States Patent Office 3,068,696
Patented Dec. 18, 1962

3,068,696
WATER METER REGISTER CASINGS
Grover H. Smith and Richard D. Wans, Seattle, Wash.;
said Wans assignor to said Smith
Filed May 7, 1956, Ser. No. 583,120
7 Claims. (Cl. 73—273)

The present invention relates principally to a water meter register casing generally of the type disclosed in Patent No. 2,738,672 for Anti-Fogging Meter. Such a register casing contains oil and preferably is made of plastic material. The present invention is concerned with providing a protective cover for a plastic register casing top and a sealing diaphragm for the lower portion of the oil-containing compartment.

In the past it has been common practice to connect the bottom portion of a register casing to the meter body by a peened joint which is not liquid-tight. Also a drain hole has been provided through the side wall of the register casing bottom near the floor, through which can drain from the register casing any water which leaks through the stuffing box from the meter body into the register casing. Conversely, of course, ground water can flow into the register casing through such drain hole and flood the register mechanism.

In the past if the register casing was to contain oil it has been necessary not only to provide an oil-tight seal between the casing bottom and the casing top enclosing the register, but also to seal the joint between the register casing bottom and the meter body and to close the drain opening. A principal object of the present invention is to provide a sealing diaphragm the periphery of which will be sealed to the register casing and the central portion of which will be apertured to pass a meter register drive shaft so as to obviate the necessity of sealing the joint between the register casing bottom and the meter body and of closing the drain aperture.

A more specific object is to provide such a sealing diaphragm which will serve the dual purpose of forming a partition between an oil-containing compartment including the register casing top and the joint between the register casing bottom and the meter body and which also will constitute a sealing gasket between the adjacent edges of the register casing bottom and the register casing top.

Another object is to provide such a sealing diaphragm which has a central aperture adapted to fit snugly about a rotating shaft of the register drive mechanism, and which will sealingly engage such shaft. An alternative object is to provide such a diaphragm having a central aperture which can be secured to a stuffing box through which a register drive shaft passes.

An additional object is to provide such a sealing diaphragm which will be economical to manufacture and which can be installed quickly and easily in a water meter. It is also an object to provide such a diaphragm which will be very durable and will not be deteriorated by contact with oil.

Another object is to provide a register casing top construction which is protected from being damaged such as by being scratched by providing a readily replaceable part which can be changed in case it should become damaged and which can be made of material which is highly resistant to being scratched or otherwise defaced.

These objects can be accomplished by incorporating in the meter register casing construction a diaphragm of any of the several types illustrated in the drawings. Such diaphragms preferably are of circular shape and may be a disk, a shallow cup, a deep cup, or a frustoconical tube. The periphery may be formed as a bead insertible between the upper edge of the register casing bottom and the lower edge of the register casing top, both to seal the periphery of the diaphragm to the casing and to seal the joint between the casing bottom and the casing top. An aperture through the central portion of the diaphragm may pass a register drive shaft either by snugly engaging the rotary shaft itself and effecting a seal relative to such shaft, or by being clamped and sealed to a stuffing box through which a register drive shaft passes. Also the diaphragm is of elastomer material unless either its inner edge or its outer edge is sealed relative to the register casing by a resilient compression joint, in which case in order to be able to exert adequate pressure on such joint the diaphragm will be made of resilient metal. The register casing top has a transparent portion through which the register is visible for reading, and such windowed portion is protected against being defaced by a readily removable and replaceable cap, preferably screw-threaded onto the closed end of the register casing top.

FIGURE 1 is a vertical sectional view through a meter register casing, and the adjacent portion of the meter body.

FIGURE 2 is an exploded view of the register casing and register seen in top perspective with parts broken away.

FIGURE 3 is a top perspective view of a diaphragm incorporated in the register casing structure shown in FIGURES 1 and 2, with parts thereof broken away.

FIGURE 8 is a side elevation view of a register casing incorporating an alternative type of diaphragm, parts being broken away, and FIGURE 9 is a top perspective view of components of such diaphragm structure shown in exploded relationship and having parts broken away.

FIGURE 10 is a side elevation view of a register casing incorporating a further modified type of diaphragm, and having parts broken away, and FIGURE 11 is a top perspective view of components of such diaphragm structure with portions broken away.

Figure 7:
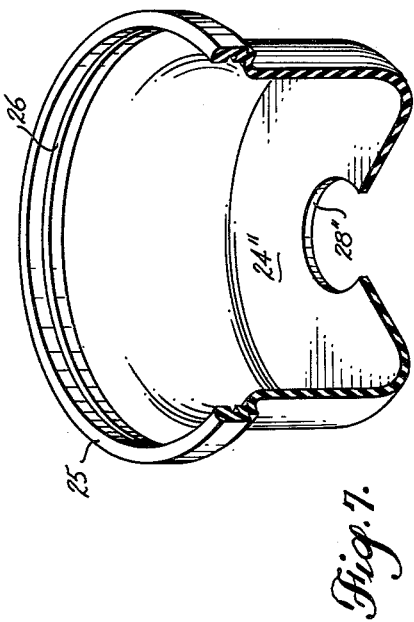
FIGURE 7 is a top perspective view of the diaphragm incorporated in the meter casing of FIGURE 6, a portion of which has been broken away.

The general features of the register mechanism shown in the drawings of the present application resemble quite closely the corresponding features of the register casing shown in FIGURE 7 of Patent No. 2,738,672 mentioned above. In general, the register casing includes a casing bottom 1 mounted on the meter body 2 and covered by the register casing top 3, which preferably is of transparent plastic material. The casing bottom customarily is secured to the meter body by a flange 4 of the meter body, which is peened over an inwardly projecting flange 5 on the lower edge of the casing bottom. While such peening operation produces a good mechanical joint, it is seldom leak-proof.

The end wall 6 of the meter body 2 constitutes the floor of the register casing and through a central aperture in this wall extends a threaded sleeve 7 constituting a stuffing box through which a register drive shaft 8 extends from the metering mechanism 9 toward the register mechanism. Such sleeve is secured to the wall 6 by a lock nut 10, and the upper end of the sleeve is closed by a stuffing nut 11 which can be tightened to compress the stuffing in the stuffing box for packing it more tightly around shaft 8. This shaft carries a gear 12 meshing with a pinion 13 which rotates a second register drive shaft 14.

The register mechanism 15, driven by the shaft 14, is of conventional character and is mounted on a supporting plate 16. The water quantity indicating pointers 17 are representative of any type of register indicating mechanism. Ordinarily the register mounting plate 16 is of a size to fit in a recess 18 in the inner periphery of the upper end of the wall of casing bottom 1, and the lower edge of the casing top will be super-imposed over the peripheral portion of the plate to retain it in place. The casing top may be anchored to the casing bottom by bolts 19 screwed into tapped ears 20 projecting outwardly from the upper edge of the casing bottom. Preferably such bolts secure in place a metal retainer ring 21 encircling the register casing top and bearing on a flange 22 projecting outwardly around the lower edge of the casing top.

In accordance with the disclosure of the aforesaid Patent No. 2,738,672 it is desirable to submerge the register mechanism in oil and provide oil substantially filling the register casing top so as to prevent condensation of moisture on the inner side of the windowed casing top end through which the register mechanism is visible, and to prevent dirt from accumulating on the inner surface of the casing stop end. To retain oil in the register casing the compartment in which the oil is placed must be leakproof. According to prior practice the joint between the register casing bottom 1 and the meter body 2 was incorporated in the oil-containing compartment, and consequently it was necessary to make this joint leak-proof, whereas the purpose of the present invention is to exclude this joint from the oil-containing compartment.

Stuffing boxes are well known not to be leak-proof, but ordinarily any slight seepage passing from the meter body 2 through the stuffing box sleeve 7 into the register casing was not considered to be particularly detrimental because any substantial amount of such seepage would drain from the register casing through a drain aperture 23 in the wall of the register casing bottom 1 just above the floor of the register casing. When the register casing was supplied with oil it was therefore necessary also to plug this drain opening. By utilizing a diaphragm within the register casing in accordance with the present invention either it is not necessary to plug the drain opening or the diaphragm itself acts to plug such opening. In any event the diaphragm constitutes a bottom portion of the oil-containing compartment in which the register mechanism is housed, the outer periphery of the diaphragm is in sealed engagement with the register casing and an aperture through the central portion of the diaphragm passes a register drive shaft either directly embracing such shaft or encircling the stuffing box through which a register drive shaft passes and being in sealed engagement with such stuffing box, or with a portion of the register casing floor encircling such stuffing box.

In the mechanism shown in FIGURE 1 the diaphragm 24 is made wholly of elastomer material of a type highly resistant to deterioration by oil, such as being of synthetic rubber. The register casing is circular as is the diaphragm. Such diaphragm is formed substantially as a disk including as integral components a circular web and a peripheral bead 25 encircling such web, shown best in FIGURE 3. In the inner periphery of this bead is an annular groove 26 of a depth and diameter suitable to embrace snugly the periphery of the register mounting plate 16. The lower edge of the bead has an annular shoulder 27 of a size and shape to fit the recess 18 in the upper edge of the wall of casing bottom 1, which normally receives the edge of register mounting plate 16. Thus it will be evident that the diameter of the groove bottom and of the annular shoulder 27 are substantially the same and the groove bottom and annular diaphragm shoulder are substantially concentric. The upper edge of the bead is received in a recess in the lower edge of the casing top 3 so that when the anchor bolts 19 are tightened to draw the retainer ring 21 downward against the flange 22 of the casing top, the lower edge of such top and the upper edge of the casing bottom will be pressed into opposite sealing engagement with the marginal bead 25 of diaphragm 24, which will thus serve as a sealing gasket. At the same time, of course, the periphery of the diaphragm will be secured in sealing engagement with the register casing.

As shown in FIGURE 1, the central portion of diaphragm 24, constituting the web, lies below the annular groove 26 and consequently below the register mounting plate 16. The web of the diaphragm, therefore, is disposed between the meter mechanism 9, and the meter register 15, so that it is necessary for the web of the diaphragm to be apertured to pass a register drive shaft unless a magnetic coupling between the meter mechanism and the register mechanism is employed, which couplings have not proven to be very satisfactory. The diaphragm shown in FIGURES 1, 2 and 3 has in its web an aperture 28 of a size to receive snugly the register drive shaft 14 carrying pinion 13. At the location of this aperture the web preferably has a reinforcing boss 29 to resist stretching of the elastomer material and to hold the diaphragm in sealing engagement with the drive shaft 14. The fit between such aperture 28 and shaft 14 may easily be tight enough to prevent oil leaking from the compartment above the diaphragm into the lower portion of the casing, even though the entire compartment from the diaphragm to the end of the casing top 3 is filled with oil.

In use, therefore, the diaphragm 24 will have its hole 28 assembled on the register drive shaft 14 by removing gear 13, if necessary, and the resilient peripheral bead 25 will be bent outward and its groove 26 will be fitted onto the margin of the register mounting plate 16. The register and diaphragm assembly can then be set on the register casing bottom 1 with the shouldered portion 27 of the diaphragm received in the recess 18 in the upper edge of the casing bottom wall, and pinion 13 in mesh with gear 12. The transparent casing top 3 may then be set on the casing bottom so that the recess in its lower edge receives the upper edge of the flange bead 25. Next the retainer ring 21 is placed over the casing top section, and the anchor bolts 19 are passed through the ears of the ring and screwed into the ears 20 on the casing bottom section. Oil may then be poured through the oil filler opening 29 in the upper end of the casing top section until the compartment above the diaphragm 24 has been substantially filled. A screw plug 30, preferably of the self-tapping variety may then be screwed into the oil filler opening 29 to seal it.

It has been found that some plastic materials of transparent character which are quite suitable for the casing top section 3 can be defaced rather easily. If the upper end surface of the casing top section becomes scraped or scratched excessively, it may be difficult to read the register. To avoid such a situation a cap 31 of easily replaceable character may be provided to cover the outer surface of the casing top end. This cap may be of plastic material similar to that of which the casing top 3 is made, may be of harder plastic material, or may be of glass. In the latter two cases the possibility of the cap becoming scratched or scraped is considerably reduced so that it will not need to be replaced frequently. In any event, however, the cap should be readily removable such as being secured to the casing top by internal screw threads 32 formed to fit the exterior screw threads 33 on the end of the casing top. To replace the cap 31 at any time, therefore, it is only necessary to unscrew the old one and screw a new one into place without any necessity of opening the register casing or breaking any seal.

Figure 4:
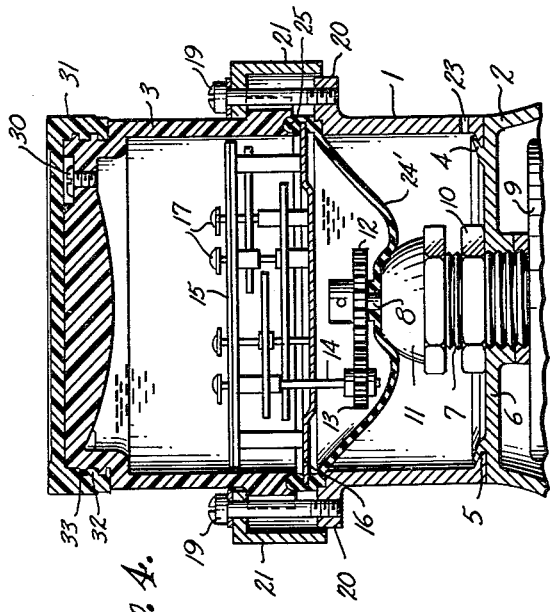
FIGURE 4 is a vertical sectional view through a register casing incorporating a different type of sealing diaphragm having parts broken away.
Figure 5:
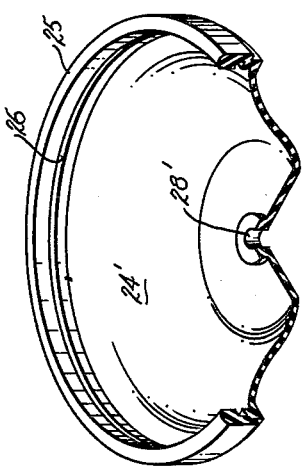
FIGURE 5 is a top perspective view of such different diaphragm having a portion broken away.

The principle of the construction shown in FIGURES 4 and 5 is the same as that shown in FIGURES 1, 2 and 3. The difference lies in the shape of the central portion of the diaphragm 24'. In this instance instead of the diaphragm being formed as a disk it is a shallow cup. The marginal bead 25, having the groove 26, is the same as on the diaphragm 24 of FIGURES 1, 2 and 3, and such bead is installed in the same way on the register mounting plate 16 and between the upper edge of the casing bottom 1 and the lower edge of the casing top 3. In this instance, however, the central portion of the diaphragm instead of passing above the gear 12 and pinion 13 is located below such gear and pinion. The aperture 28' in this case is not only in the central portion of the diaphragm, but is precisely in its center. The aperture 28' will pass the portion of the register drive shaft 8 immediately above the stuffing nut 11 of the stuffing box 7. This aperture should fit snugly about the shaft 8 so as to constitute a seal preventing oil from leaking through the aperture and preferably a reinforcing boss encircling the hole is provided, as shown best in FIGURE 5.

The central portion of the shallow cup diaphragm will drape beneath the gear 12 and pinion 13 and over the stuffing nut 11, generally as shown in FIGURE 4, and will constitute the bottom of the oil-containing compartment in which the register mechanism 15 is housed, submerged in the oil. In this instance the gear 12 may be removed from the register drive shaft 8, the aperture 28' fitted over the shaft, and then the gear replaced on it before the register mechanism is put in place. Thereafter the register mechanism may be set onto the lower casing part 1 with the pinion 13 in mesh with gear 12 and the diaphragm bead 25 fitted around the register mounting plate 16 with its edge received in groove 26. The transparent plastic casing top 3 may then be set on the bead 25, secured in place, and filled with oil as described in connection with the type of installation shown in FIGURES 1, 2 and 3.

Figure 6:
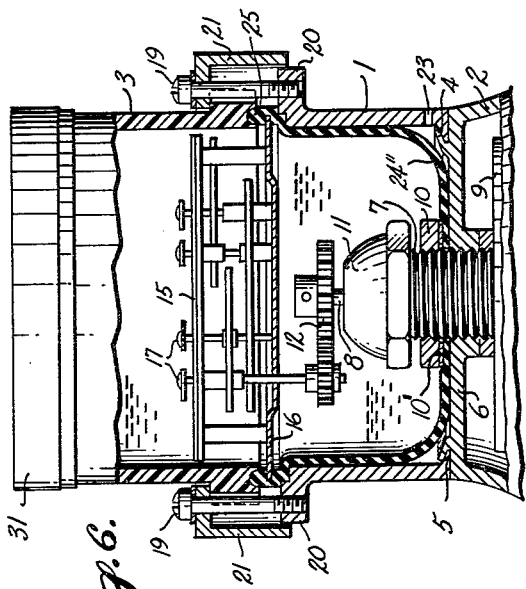
FIGURE 6 is a side elevation view of a register casing incorporating another type of diaphragm and having parts broken away.

Like the disk diaphragm 24 of FIGURES 1, 2 and 3 and the shallow cup diaphragm 24' of FIGURES 4 and 5, the deep cup diaphragm 24" shown in FIGURES 6 and 7 also is formed entirely of elastomer material. Again the marginal bead 25 formed integral with the central portion of the diaphragm is similar to the beads on the diaphragms of FIGURES 1 and 4, and has in it the groove 26 for receiving the marginal portion of the register mounting plate 16. The central portion of the cup 24" is sufficiently deep not only to pass beneath the gear 12 and pinion 13, but, as shown in FIGURE 6, also passes beneath the stuffing nut 11 and the lock nut 10. The central aperture 28" in this instance is of a size sufficient to fit over the stuffing box sleeve 7 and does not contact directly the register drive shaft 8, although such aperture 28" does pass this shaft, of course, because it extends through the stuffing box.

To install the deep cup diaphragm of FIGURES 6 and 7 not only must the gear 12 be removed from the register drive shaft 8, but the stuffing nut 11 and the lock nut 10 must be removed from the stuffing box sleeve 7. The diaphragm is then fitted into the casing bottom 1 and the aperture 28" in the central portion of the diaphragm is fitted over the stuffing box sleeve 7. Preferably the diaphragm is deep enough so that its central portion will drape onto the floor of the register casing formed by the wall 6 for an appreciable distance outwardly from the stuffing box sleeve. A washer 10' is then placed over such sleeve and the lock nut 10 is screwed down onto the washer to effect an oil-tight seal between the edge portion of the diaphragm encircling the aperture 28" and the stuffing box. The washer 10' will not rotate appreciably as the lock nut 10 is screwed down because it will bear against and be embedded somewhat in the elastomer diaphragm, as shown in FIGURE 6. The stuffing nut 11 and gear 12 may then be replaced and the register mechanism 15 may be set onto the casing bottom part and the edge portion of its plate 16 fitted into the groove 26 of the diaphragm's marginal bead 25 in the manner previously explained. Thereafter the casing top 3 may be installed as described and the compartment filled with oil, the diaphragm 24" constituting the bottom of such compartment.

The diaphragms shown in FIGURES 8 and 10 differ from the diaphragms shown in FIGURES 1 to 7, inclusive, described above, in that while the latter diaphragms are all formed entirely of elastomer material, the diaphragms of FIGURES 8 to 11, inclusive, are formed principally of resilient sheet metal. The diaphragm 34 shown in FIGURES 8 and 9 is of generally frustoconical shape having a flange 35 extending outwardly from its outer edge. When installed such diaphragm extends generally from the junction between the casing bottom 1 and the casing top 3 downward and inward to a location adjacent to the stuffing box through which the register drive shaft 8 extends. The upper and lower edges of the diaphragm are sealed relative to the register casing by gasket rings of elastomer material, such as oil resistant synthetic rubber of the type of which the gaskets described above may be made, and these gaskets either may be loose or may be suitably bonded to the inner and outer edges of the sheet metal gasket 34 so as to constitute a unitary structure.

The ring gasket 25' is shaped generally similar to the marginal bead 25 on the elastomer diaphragms previously described and has in its inner periphery a groove 26' similar to the grooves 26 in such beads for receiving the edge portion of the register mounting plate 16. This gasket ring will fit between the upper edge of the casing bottom 1 and the lower edge of the casing top 3 in the same manner as the marginal diaphragm beads previously described, both to effect a seal between these parts and to support the register mechanism. Such gasket ring has still another function, however. As shown best in FIGURE 8, the outwardly extending flange 35 of the diaphragm 34 is of a size to fit into the recess 18 in the upper edge of the casing bottom 1. The height of the diaphragm and the thickness of the lower and inner gasket ring 36 is somewhat greater than the height of the casing bottom 1 when the ring 36 is in relaxed condition.

The lower end of the conical diaphragm 34 may have an inwardly extending cupped flange 37 to fit over the gasket ring 36, which preferably is of circular cross section. Reception of the gasket ring in the recess of flange 37 will deter displacement of the ring relative to the diaphragm during installation. When the ring 36 is placed on the floor of the register casing formed by the meter body wall 6 and the diaphragm is set on it, the upper edge of the diaphragm will project somewhat above the upper edge of the casing bottom 1. The register mechanism may then be set in place and if the gasket ring 25' is not bonded to the flange 35 of the diaphragm, such gasket ring may be fitted onto the margin of the register mounting plate 16 before the register is set onto the casing bottom. In either case tightening of bolts 19 to clamp the casing top onto the casing bottom will result in an axial thrust being exerted by the ring gasket 25' on the diaphragm flange 35. This thrust will be transmitted by the diaphragm wall and exerted by the inner flange 37 on the lower gasket ring 36, which will deform it somewhat, as shown in FIGURE 8, and press it into intimate contact with the floor of the register casing around the stuffing box to effect a tight seal between such floor and the gasket ring and between such ring and the flange 37 of the diaphragm. The pressure of the gasket ring 25' on the upper and outer flange 35 of the diaphragm will, of course, effect a tight seal at the outer edge of the diaphragm also. Again, therefore, the diaphragm 34 and the gasket rings 25' and 36 form a sealed bottom for the oil-containing compartment within the register casing.

While the diaphragm of the register casing shown in FIGURE 10 is also made principally of resilient sheet metal, in this instance the diaphragm is of disk shape rather than being frustoconical. Instead of the diaphragm being located substantially in registery with the joint between the casing bottom 1 and the casing top 3, as in the construction of FIGURE 1, however, the diaphragm is located in the lower portion of the casing bottom. The joint between the casing bottom and the casing top and the manner in which the register mounting plate is supported on the casing bottom may be as disclosed in FIGURE 7 of Patent 2,738,672, mentioned above, or a similar seal may be employed and the meter mounting plate 16 and the marginal recess 18 may be interfitted. In either event the gasket ring 25″ interposed between the casing top and the casing bottom will be entirely separate and separated from the diaphragm structure constituting the bottom of the oil-containing compartment within the register casing.

In the construction of FIGURES 10 and 11 the resilient sheet metal diaphragm 38 is of a radial extent slightly less than the internal size of the casing bottom 1. This diaphragm may be virtually a flat disk, but its marginal portion preferably includes a flange portion 39 bent upward somewhat from the central portion of the disk. A gasket ring 40, preferably of circular cross section, cooperates with the marginal portion of the diaphragm 38 and may, if desired, be bonded to the under side of the flange 39. In the central portion of the diaphragm is an aperture 41 of a size to fit over the stuffing box sleeve 7, and consequently passes the register drive shaft 8 which extends through the stuffing box. A flat washer or sealing gasket 42 of a size corresponding to the size of the diaphragm aperture 41 may be superimposed on the central portion of the diaphragm and may either be loose or bonded to the upper surface of the diaphragm. A metal washer 43 may be placed over the gasket washer, and it also may be bonded to the gasket or be loose.

In installing the diaphragm in the construction shown in FIGURE 10 again the gear 12 must be removed from the register drive shaft 8 and the stuffing nut 11 and lock nut 10 are removed from the stuffing box sleeve 7. The gasket ring 40 is then placed in the lower corner of the casing bottom 1 and should contact the side wall of the casing bottom sufficiently high to cover the drain aperture 23. Next the diaphragm 38 is placed in the casing bottom so that its central aperture 41 fits over the stuffing box sleeve 7 and its marginal flange 39 rests on the ring gasket 40. If the gasket 42 and washer 43 are loose, they are then fitted over the stuffing box sleeve and the lock nut 10 is screwed onto such sleeve. The lock nut is screwed down far enough to lock the sleeve 7 and to produce a tight seal between the lock nut and the diaphragm 38 by compression of the gasket 42. Simultaneously such tightening of the lock nut will cause the flange 39 to press downward and outward on the gasket ring 40 for deforming it into intimate contact both with such flange and with the wall of the casing bottom above the peened flange 4. This action will thus effect a tight seal between the wall of the casing bottom and the outer edge portion of the diaphragm 38.

After the diaphragm 38 has been thus installed the stuffing nut 11 and gear 12 may be replaced. Next the register mechanism 15 may be set on the upper edge of the casing bottom with the pinion 13 in mesh with gear 12 and the gasket 25″ and casing top 3 put in place in the manner previously described.

While it will be evident that all the diaphragm structures described will effect a leak-proof bottom for the oil-containing compartment of the casing without the necessity of sealing the joint between the casing bottom and the meter body, the diaphragm types of FIGURES 1 and 4 have some advantages over the diaphragm types shown in FIGURES 6, 8 and 10. The diaphragms of FIGURES 1 and 4 effect a seal above the stuffing box through which register shaft 8 passes, so that if this stuffing box should leak the water would not pass into the oil-containing chamber, but would flow out of the casing bottom through the usual drain aperture 23. No matter how worn the stuffing within the stuffing box might become, the oil in the oil-containing compartment could never be subjected to the pressure of the water in the meter body. Moreover, the capacity of the oil-containing compartment in the structures of FIGURES 1 and 4 is considerably less than the capacity of the compartment in the structure of FIGURES 6, 8 and 10 so that less oil is required to maintain the compartments substantially full.

On the contrary, where the diaphragm structures shown in FIGURES 6, 8 and 10 are used, the oil may be subjected somewhat to the pressure of the water in the meter body. If the stuffing box stuffing becomes sufficiently worn, the seal of the diaphragm's central aperture in each case is quite positive because such seal is accomplished between parts which do not move. In the diaphragm installations of FIGURES 1 and 4, however, the central apertures fit about rotating shafts and hence would be more subject to wear and probably would not form as tight a seal as the seals of the diaphragm's central apertures shown in FIGURES 6, 8 and 10. In any case, however, the seals will be satisfactory for practical purposes, and if the apertures in the diaphragms of FIGURES 1 and 4 should become worn excessively, the diaphragms can easily be replaced. Similarly, if the stuffing in the stuffing boxes of FIGURES 6, 8 and 10 become worn excessively, such stuffing may be replaced with little difficulty.

Another advantages of the elastomer diaphragm shown in FIGURES 1 to 7, inclusive, is that when the oil in the oil-containing compartment expands and contracts with temperature changes and the compartment is completely filled with oil, the diaphragm will yield to accommodate the larger volume without substantial pressure being exerted on the register casing top by such increased oil volume. Particularly in the types of diaphragm shown in FIGURES 1 to 5, inclusive, it is important that any appreciable oil pressure be relieved by such flexing of the diaphragm in order to prevent oil being forced through its central aperture past the register drive shaft which such aperture embraces.

We claim as our invention:

1. A water meter register comprising a register casing bottom section, means closing the lower end of said register casing bottom section, a register casing top section superimposed on said register casing bottom section, a diaphragm of elastomer material engaging the upper end of said register casing bottom section and the lower end of said register casing top section and including a web portion and a generally circular flange bead projecting axially from the margin of said web portion and fitted between said register casing bottom section and said register casing top section, the inner side of said flange bead having therein an annular groove spaced above said web portion, said web portion having an aperture therethrough, register mechanism received within said casing and including a mounting plate having its margin received in such flange bead groove and a drive shaft passing through such web portion aperture, and means securing together said register casing bottom section and said register casing top section with said flange bead of said diaphragm clamped therebetween and supporting said register mechanism mounting plate.

2. The water meter register defined in claim 1, further including a stuffing box in the lower portion of the register casing bottom section, the register mechanism drive shaft passing through said stuffing box, and the diaphragm aperture encircling said stuffing box.

3. The water meter register defined in claim 2, and further including means sealingly connecting the stuffing box and the portion of the diaphragm adjacent to the aperture encircling the stuffing box.

4. A water meter register comprising register mechanism including a mounting plate and a drive shaft, a register casing bottom section having a recess in the inner periphery of its upper end of a size to receive therein the margin of said register mechanism mounting plate, a register casing top section superimposed on said register casing bottom section, a diaphragm closing the upper end of said register casing bottom section and the lower end of said register casing top section and having an annular shoulder in its lower marginal portion received in such recess of said register casing bottom section, said diaphragm including a generally circular web portion having an aperture therethrough through which said drive shaft passes and a flange bead projecting axially upwardly from the margin of said web portion and fitted between said register casing bottom section and said register casing top section, the inner side of said flange bead above said diaphragm having therein an annular groove in which the margin of said register mechanism mounting plate is received, the diameter of the bottom of such groove being substantially equal to the diameter of said annular diaphragm shoulder, and such groove bottom and annular diaphragm shoulder being substantially concentric, and means securing together said register casing bottom section and said register casing top section with said flange bead of said diaphragm clamped therebetween and supporting said register mechanism mounting plate.

5. A water meter register casing divider for holding a register mechanism mounting plate, comprising a diaphragm including a generally circular web portion having a drive shaft receiving aperture therethrough and a flange bead of elastomer material projecting axially from the margin of said web portion, the base of said flange bead being recessed externally to form an annular shoulder and the interior of said flange bead having a mounting plate receiving peripheral groove spaced axially from said web portion and of a depth such that the diameter of the bottom of such groove is substantially equal to the diameter of said annular shoulder formed by such external recess.

6. A water meter register casing divider for holding a register mechanism mounting plate, comprising a diaphragm of elastomer material including a generally circular web portion having a drive shaft receiving aperture therethrough and a flange bead projecting axially from the margin of said web portion and integral therewith, the base of said flange bead being recessed externally to form an annular shoulder and the interior of said flange bead having a mounting plate receiving peripheral groove disposed in a plane spaced axially from said web portion and of a depth such that the diameter of the bottom of such groove is substantially equal to the diameter of said annular shoulder formed by such external recess.

7. A water meter register casing divider for holding a register mechanism mounting plate, comprising diaphragm means having a drive shaft encircling aperture therethrough, and a circular bead of elastomer material extending around the edge of said diaphragm means and having an axial edge thereof recessed externally to form an annular shoulder and the interior of said flange bead having a mounting plate receiving peripheral groove spaced axially from said annular shoulder and of a depth such that the diameter of the bottom of such groove is substantially equal to the diameter of said annular shoulder formed by such external recess.

References Cited in the file of this patent

UNITED STATES PATENTS

| | | | |
|---|---|---|---|
| 165,673 | Helme | July 20, | 1875 |
| 1,016,934 | Charlton | Feb. 13, | 1912 |
| 1,146,674 | Van Gilder | July 13, | 1915 |
| 1,495,010 | Ford | May 20, | 1924 |
| 1,807,139 | Volodimirov | May 26, | 1931 |
| 2,159,892 | Hanks | May 23, | 1939 |
| 2,246,250 | Hanks | June 17, | 1941 |
| 2,354,563 | Weisse | July 25, | 1944 |
| 2,423,604 | McCord | July 8, | 1947 |
| 2,493,098 | Abrams | Jan. 3, | 1950 |
| 2,738,672 | Smith | Mar. 20, | 1956 |
| 2,742,785 | St. Clair | Apr. 24, | 1956 |
| 2,854,848 | Hood | Oct. 7, | 1958 |
| 2,884,782 | Raub et al. | May 5, | 1959 |